United States Patent [19]

Peterson

[11] Patent Number: 4,526,272
[45] Date of Patent: Jul. 2, 1985

[54] LATERALLY BENDABLE BELT CONVEYOR

[75] Inventor: William J. Peterson, Coraopolis, Pa.

[73] Assignee: The United States of America as represented by the United States Department of Energy, Washington, D.C.

[21] Appl. No.: 422,796

[22] Filed: Sep. 24, 1982

[51] Int. Cl.³ .............................................. B65G 21/10
[52] U.S. Cl. .................................... 198/819; 198/839; 198/864
[58] Field of Search ................ 198/303, 819, 839, 864

[56] References Cited

U.S. PATENT DOCUMENTS

| | | | |
|---|---|---|---|
| 1,530,707 | 3/1925 | Warner | 198/714 |
| 2,260,587 | 10/1941 | Shields | 198/317 |
| 2,417,477 | 3/1947 | Finney, Jr. | 198/497 |
| 2,753,983 | 7/1956 | Bloomer | 198/822 |
| 2,818,962 | 1/1958 | Horth | 198/822 |
| 2,818,965 | 1/1958 | Horth | 198/317 |
| 2,836,283 | 5/1958 | Horth | 198/303 |
| 2,867,315 | 1/1959 | Lanier, Jr. | 198/838 |
| 2,955,699 | 10/1960 | Lanier, Jr. | 198/303 |
| 2,969,878 | 1/1961 | Finney, Jr. | 198/825 |
| 3,077,990 | 2/1963 | Peterson | 198/813 X |
| 3,193,086 | 7/1965 | Wilhelm | 198/807 |
| 3,194,387 | 7/1965 | Poundstone | 198/825 |
| 3,288,298 | 11/1966 | Daugherty et al. | 210/401 |
| 3,300,023 | 1/1967 | Creutzmann et al. | 198/862 X |
| 3,327,839 | 6/1967 | Sigety et al. | 198/835 |
| 3,545,598 | 12/1970 | McGinnis | 198/833 X |
| 3,701,411 | 10/1972 | McGinnis | 198/303 |
| 3,707,218 | 12/1972 | Payne et al. | 198/831 |
| 3,863,752 | 2/1975 | Sibley | 198/303 |
| 4,024,949 | 5/1977 | Kleysteuber et al. | 198/818 |
| 4,061,223 | 12/1977 | McGinnis | 198/831 X |
| 4,166,528 | 9/1979 | Renner | 198/825 |
| 4,204,949 | 5/1980 | Jedo et al. | 209/254 X |
| 4,206,840 | 6/1980 | Hanson | 198/301 |
| 4,339,031 | 7/1982 | Densmore | 198/864 |

FOREIGN PATENT DOCUMENTS

| | | | |
|---|---|---|---|
| 943817 | 10/1950 | Fed. Rep. of Germany | 198/819 |
| 206386 | 12/1967 | U.S.S.R. | 198/839 |
| 704861 | 12/1979 | U.S.S.R. | 198/819 |
| 797980 | 1/1981 | U.S.S.R. | 198/839 |

OTHER PUBLICATIONS

Article entitled, "The Serpentix Conveyor", vol. 1, No. 1, pp. 1-4, (date unknown).
"Belt Conveyors", vol. 23, pp. 42-45, (date unknown).
Brochure—"2FCT-1BH Flexible Conveyor Train", Joy Manufacturing Company, Bulletin #J322, (date unknown).

Primary Examiner—Joseph E. Valenza
Assistant Examiner—Stuart J. Millman
Attorney, Agent, or Firm—Hugh W. Glenn; Robert J. Fisher; Judson R. Hightower

[57] ABSTRACT

An endless, laterally flexible and bendable belt conveyor particularly adapted for coal mining applications in facilitating the transport of the extracted coal up- or downslope and around corners in a continuous manner is disclosed. The conveying means includes a flat rubber belt reinforced along the middle portion thereof along which the major portion of the belt tension is directed so as to cause rotation of the tubular shaped belt when trammed around lateral turns thus preventing excessive belt bulging distortion between adjacent belt supports which would inhibit belt transport. Pretension induced into the fabric reinforced flat rubber belt by conventional belt take-up means supports the load conveyed when the belt conveyor is making lateral turns. The carrying and return portions of the belt are supported and formed into a tubular shape by a plurality of shapers positioned along its length. Each shaper is supported from above by a monorail and includes clusters of idler rollers which support the belt. Additional cluster rollers in each shaper permit the belt supporting roller clusters to rotate in response to the belt's operating tension imposed upon the cluster rollers by induced lateral belt friction forces. The freely rotating roller clusters thus permit the belt to twist on lateral curves without damage to itself while precluding escape of the conveyed material by effectively enclosing it in the tube-shaped, inner belt transport length.

11 Claims, 16 Drawing Figures

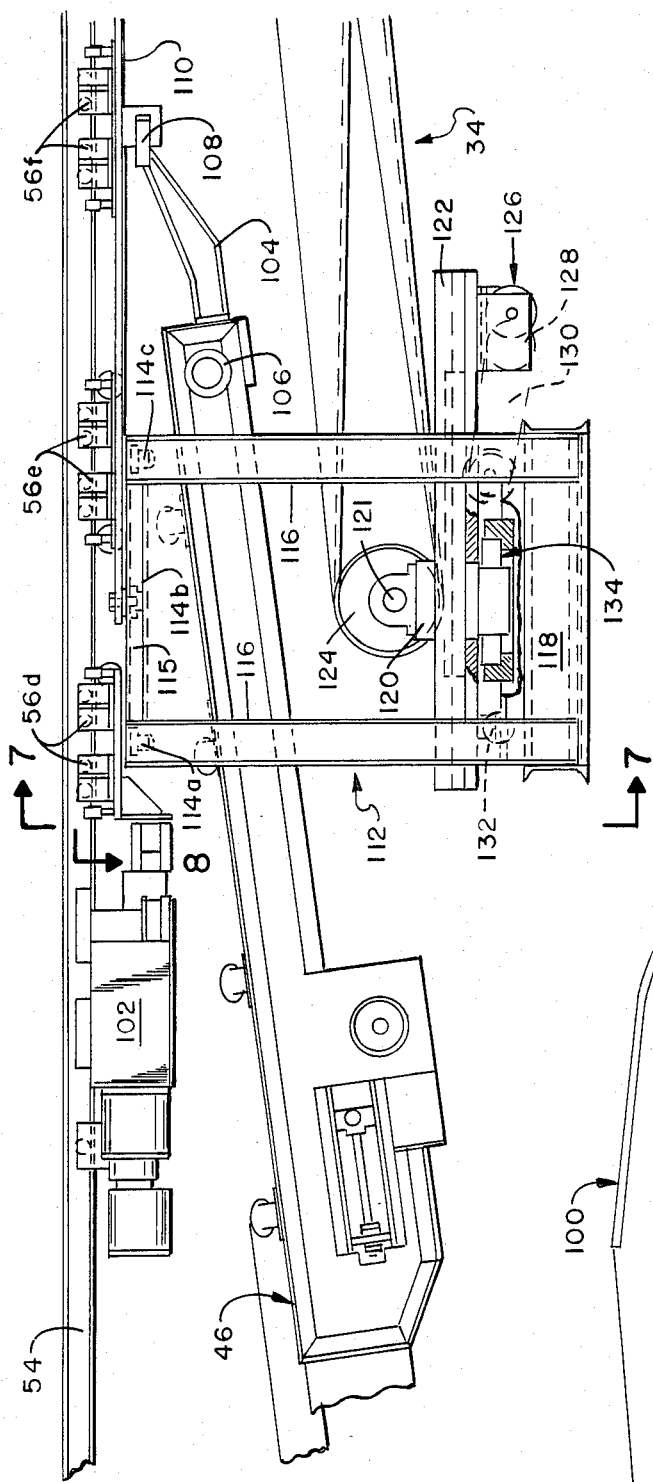
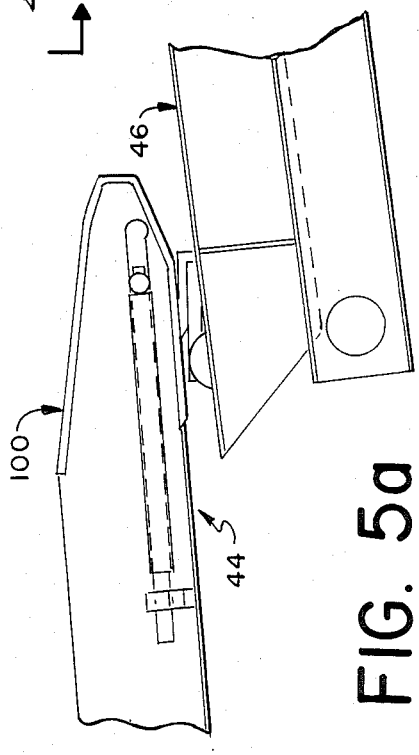
FIG. 5b
FIG. 5a

1

LATERALLY BENDABLE BELT CONVEYOR

RIGHTS OF THE U.S. GOVERNMENT

The United States Government has rights in this invention as the inventor is an employee of the United States Government.

BACKGROUND OF THE INVENTION

This invention relates generally to conveyor belt type material transport systems and is specifically directed to an endless, laterally bendable belt conveyor system particularly adapted for the continuous face haulage of particulate material up- or downslope and around corners.

Since the introduction of the continuous mining machine in the coal industry in the 1950's, a continuing attempt has been made to replace the intermittent, batch-type haulage system provided by shuttle car face haulage with a conveyor type, continuous face haulage system in order to increase coal transport efficiency and take full advantage of the continuous mining machine. The shuttle car change period inherently reduces continuous mining machine operating time because the miner must stop extracting while waiting for the replacement of a full shuttle car by an empty shuttle car in this sequential loading and removal operation.

Frequently in conveying bulk material in the coal mining environment as well as other industrial applications, it is necessary to transport the material around a corner in a curved displacement path. Generally, a flat conveyor belt is unable to negotiate a transverse curve because its two edges cannot accommodate the difference in length between the inside bend radius and the outside bend radius. In this situation the inside edge collapses because the edge tension cannot be maintained due to the shortened radius. As a result, the transported load on the belt is spilled over the inside while the outer edge of the belt tends to roll up over the conveyor belt pushing the material on the belt toward the inside edge resulting in further spillage of the particulate matter being transported.

There are two basic types of conveyor systems designed for continuous face haulage. One is a string of short, standard, cascading conveyors mounted on mobile vehicular carriers and arranged in a train-like fashion. This approach, with its multiplicity of conveyor drives, has the inherent disadvantage of excessive dust generation and requires the accurate placement of adjacent conveyor sections in order to avoid coal spillage at transfer points. In addition, because this approach relies on a plurality of independently acting conveyor systems, it possesses inherent reliability limitations.

The second basic type of conveyor system for continuous face haulage involves the use of a single, articulated conveyor designed to make lateral turns in an ever-changing path which its mobile frame follows in advancing behind the continuous mining machine. This second approach, which does not suffer from the aforementioned limitations of the cascade-type of conveyor system, has generally followed two lines of development.

One approach includes a belt having outer edges of reduced thickness with guide rollers engaging the edges to hold the edge along the outer transverse bend down and to partially collapse the inner edge as it goes around the inside transverse bend. Typically the belt, which is very expensive, used in such systems is provided with lateral convolutions to permit lateral bending, imbedded wire ropes along its longitudinal center line to accommodate the operating tension of the belt, and lateral steel rods imbedded across the width of the belt to provide load support when the belt travels between intermediate roller supports. Edge rollers mounted on each intermediate roller stand and bearing on the edge of the belt guide the belt along its circuitous path. This type of belt is subject to substantial wear, particularly along the edges which are inherently weak due to reduced thickness. Also, the edges of the belt are subjected to substantial crushing pressure by the guide rollers, creating the tendency to cause premature wearing and fraying of the belt edges. This inevitably leads not only to early belt replacement, but also to the belt jumping out from between the rollers under periodic heavy loading conditions causing spillage and system down time. Examples of conveyor systems utilizing this approach are disclosed in U.S. Pat. Nos. 3,545,598, 3,701,411 and 4,061,223 to McGinnis, and 3,863,752 to Sibley.

The second approach used in non-cascading types of conveyor systems is of a substantially older design than the first approach described above. This approach typically employs a chain-driven, multiple pan conveyor having rigid sides shaped to prevent side spillage of material and an underlying continuous belt that prevents the material from dropping through the clearances between the articulated pans. The fabrication costs of the pans and underlying belt make this approach prohibitively expensive for many applications while conveying capacity for a given belt width and height is limited by pan size. Finally, the interacting metal pans and the chain drive of the system inherently cause excessive wear between adjacent, coupled components and generate excessive noise making this approach less desirable under normal working conditions. Examples of the articulated pan conveyor approach are described in U.S. Pat. Nos. 2,818,962, 2,818,965 and 2,836,283 to Horth, and 3,707,218 to Payne, et al.

Other conveyor belt designs which are modifications of the first approach discussed above can be found in the prior art. One such approach is described in U.S. Pat. No. 4,024,949 to Kleysteuber and the present applicant wherein is described an endless conveyor apparatus having pretensioned elastic beads attached to the load-carrying portion of the conveyor belt to allow the belt to bend transversely so as to accommodate a curve. The pretensioning of the beads traveling in the guide rollers is sufficient so that for the given maximum curve of the conveyor belt there is still sufficient tension in the inside bead to hold up the edge of the load portion. Along the outside transverse bend radius of the conveyor belt, the elasticity of the beads is sufficient to allow the bead to stretch further to a maximum tension thereby accommodating the greater radius without bending over. The preferred conveyor belt is a laterally convoluted, molded belt with wire ropes embedded in its center for absorbing the operating tension to which the belt is subjected. To this convoluted belt are attached pretension elastic edge cords. Since this mechanical attaching must be done in place on the conveyor frame, this approach is somewhat impractical for use in a coal mine environment.

Another approach to the design of an endless conveyor belt system adapted to convey around curves as well as along straight lines is disclosed in U.S. Pat. No.

2,867,315 to Lanier. This system includes a head pulley at one end and a tail pulley at the other end thereof around which the endless conveyor belt passes. The portion of the belt intermediate the head and tail pulleys is supported by a plurality of wheels mounted on the sides of the belt at intervals and positioned to engage a subjacent surface and support the belt without the necessity of providing idler supports. Thus, troughing idlers and return rolls are entirely eliminated in this system. Finally, a closed belt conveyor system making use of an endless zipper belt in which the material transported is completely enclosed is disclosed in "Materials Handling Handbook" by H. A. Bolz as once manufactured by Stephens-Adamson Mfg. Co. The endless zipper belt includes a flat base belt with two flexible side walls hinged to its edges. The outer edges of the side walls are provided with teeth which may interlock to form a complete enclosure for transporting materials which must be isolated from the surroundings. The base is of rubberized fabric plies to provide body and tensile strength, while the side walls are solid rubber with keys molded integrally therein. The belt can be carried around bends on a series of rollers. This approach is not only expensive when compared with conventional conveyor belt designs, but also suffers from reliability problems because of fouling of the zipper by the conveyed, particulate material.

The present invention is intended to overcome the aforementioned problems of the prior art by providing a relatively inexpensive, reliable and efficient endless conveyor belt apparatus which is readily compatible with hostile environments such as found in underground mining operations.

OBJECTS AND SUMMARY OF THE INVENTION

Accordingly, it is an object of the present invention to provide an improved means for transporting bulk materials.

It is another object of the present invention to provide a conveying apparatus adapted to convey around curves as well as along straight lines and up- and downslope as well as in a horizontal direction.

Still another object of the present invention is to provide an improved conveying apparatus for completely enclosing the transported material when displaced around a corner in precluding material spillage.

A further object of the present invention is to provide an improved material transport system particularly adapted for the continuous face haulage of recovered coal in a coal mine.

A still further object of the present invention is to provide a more economical, reliable and environmentally safe means for continuously transporting coal in a circuitous path as generally encountered in a coal mine.

It is still another object of the present invention to provide an endless, laterally flexible belt conveyor system wherein belt guide forces are applied to the broad underside of the belt rather than to the edge portions thereof for reducing belt wear and the power required to drive the belt conveyor system.

The present invention contemplates an endless, laterally flexible and bendable, belt conveyor which affords continuous material transport in a straight and level direction or around corners and either up- or downslope. The present invention is particularly adapted for use in a coal mine environment in combination with a continuously advancing mining machine.

The laterally bendable belt conveyor of the present invention is suspended from a monorail track with tramming power provided by three separate drive systems, one located at the tailpiece portion and two located at the head end thereof. The belt is driven by a tandem roller arrangement with a pivotable tail pulley positioned by a servo drive which has a belt edge detector. An output signal from the belt edge detector is properly modulated, converted and amplified to actuate a belt hydraulic tracking cylinder so as to maintain belt tracking on the tail pulley.

In a preferred embodiment, the belt is comprised of a fabric reinforced flat rubber belt which is strengthened in the center portion thereof so as to rotationally displace the tubular shaped belt when transported around a lateral curve. This avoids excessive bulging of the loaded belt between adjacent, intermediate belt supports which would substantially increase belt power requirements. Belt pretension is provided by a conventional belt conveyor take-up for providing load support in lateral turns.

The carrying and return portions of the belt are formed into inner and outer tubular configurations, respectively, by a plurality of shapers which also provide for belt support by means of clusters of idler rollers mounted therein. Additional rollers in each cluster allow for the rotation of the belt supporting roller clusters in response to the belt's operating tension induced by lateral belt frictional forces. In operation, transport of the belt along a curved path results in belt rotation within the belt shapers until rotational static equilibrium is established between the weight of the material transported and the cluster rotational components of the belt's operating tension. The angular rotation of the cluster thus varies directly with belt operating tension and the cluster's position in the turn and inversely with the coal load, the polar moment of inertia of the twisting belt and the shear modulus of the belt material. The free rotation of the roller clusters in each primary belt shaper permits the belt to twist on lateral curves without damage to itself or discharge of the conveyed load.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference characters identify like elements throughout the various figures, in which:

FIGS. 5a, 5b and 5c are side views of a discharge conveyor arrangement of a continuous mining machine cooperatively coupled to the tail end of the laterally bendable belt conveyor system of the present invention which shows the drive means therein, FIG. 5c is on a separate sheet;

DESCRIPTION OF THE PREFERRED EMBODIMENT

Figure 1:
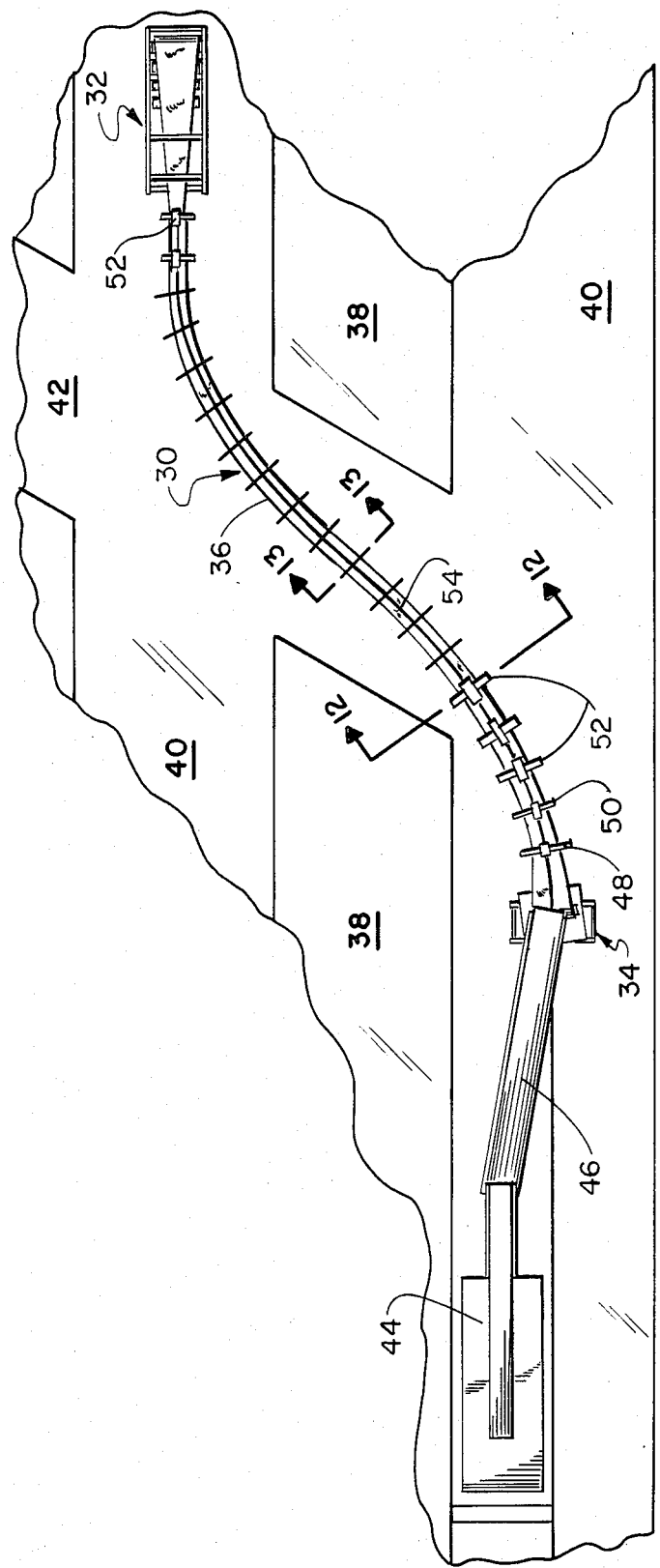
FIG. 1 is a top plan view of the laterally bendable belt conveyor of the present invention as used in a typical room-and-pillar underground mining environment.

Referring now to FIG. 1, there is shown a laterally bendable belt conveyor system 30 in accordance with the present invention disposed in a serpentine fashion in a typical room-and-piller underground mine gallery. The conveyor system 30 is curved transversely as it bends around the corners of the mine walls or pillars 38. The mine itself includes a maze of entries 40 traversed by cross cuts 42 through which a continuous mining machine 44 is moved for dislodging the material to be recovered. In a preferred embodiment of the invention, the conveyor system includes a head end 32 and a tail end 34 each of which is provided with a self-propelled tractor (not shown) in a conventional manner. The head end 32 represents the discharge end of the conveyor, while the tail end 34 of the conveyor represents the receiving end thereof. Thus, in a preferred embodiment of the present invention the conveyor system's tail end 34 is pivotally coupled to a continuous mining machine 44 by means of the miner's bridge conveyor 46 for delivering solid particulate material hereto. The continuous miner 44 is pivotally coupled to the tail end 34 of the conveyor system in providing for the free lateral movement of the continuous miner operating along the width of an entry 40 without requiring the tail end of the conveyor system to be moved for each displacement of the continuous miner. The solid particulate material is transported from the conveyor system's tail end 34 to its head end 32 by means of a flexible, endless belt 36. The excavated material may then be discharged into or onto a more conventional material transport system for removing it from the mine.

Located between the head and tail ends 32, 34 of the laterally bendable belt conveyor system 30 are a plurality of spaced belt carriages which serve the purpose of not only supporting the flexible, endless belt 36, but also of shaping the belt to facilitate its transport along the conveyor path and to provide an efficient means for supporting and transporting the excavated material. Proceeding from the tail end 34 of the conveyor system to its head end 32, there is first encountered a first intermediate belt shaper 48, followed by a second intermediate belt shaper 50 which, in turn, is followed by a plurality of primary belt shapers located between the second intermediate belt shaper 50 and the head end 32 of the conveyor system 30. The number of primary belt shapers 52 in the conveyor system is, of course, a function of the system's length. All primary belt shapers 52 are basically of the same design and configuration and perform the same function. However, the first and second intermediate belt shapers 48, 50 have unique configurations and designs because of their relative locations along the conveyor path. The various configurations of these belt carriages which both shape and support the flexible, endless belt 36 are described in detail below.

Figure 2:
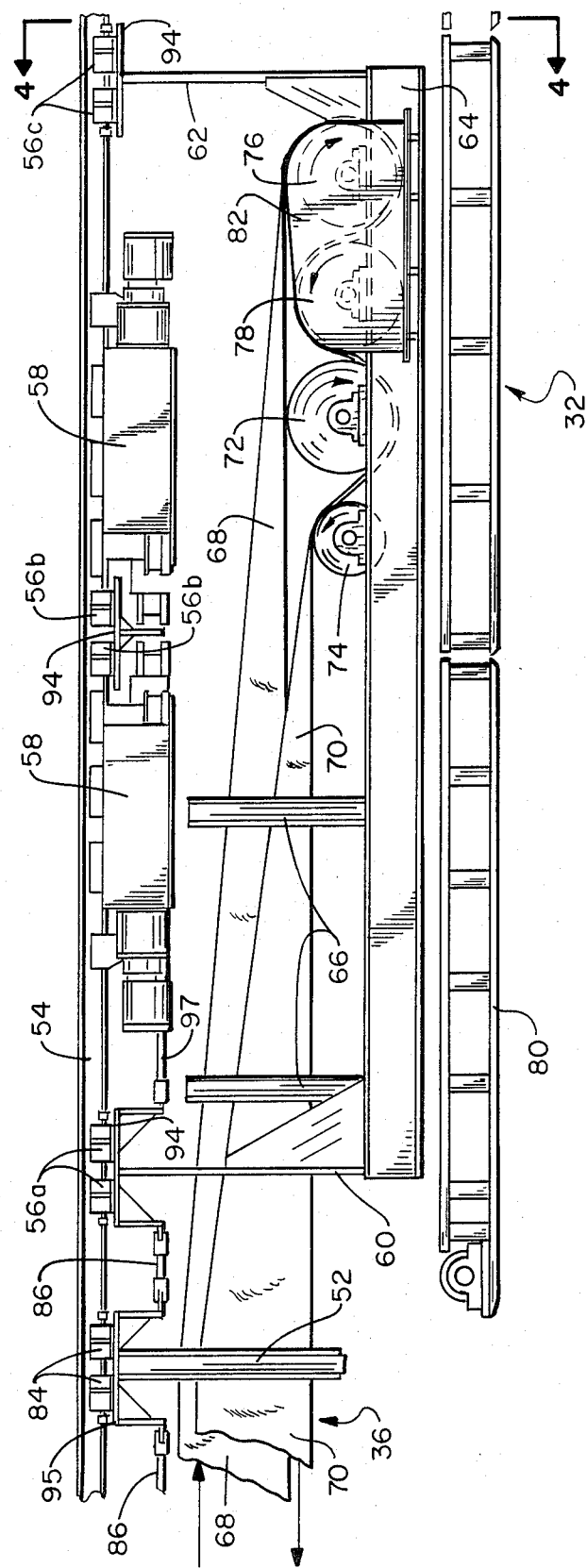
FIG. 2 is a side view of the head end of the laterally bendable belt conveyor system of the present invention showing the belt drive means therein.
Figure 3:
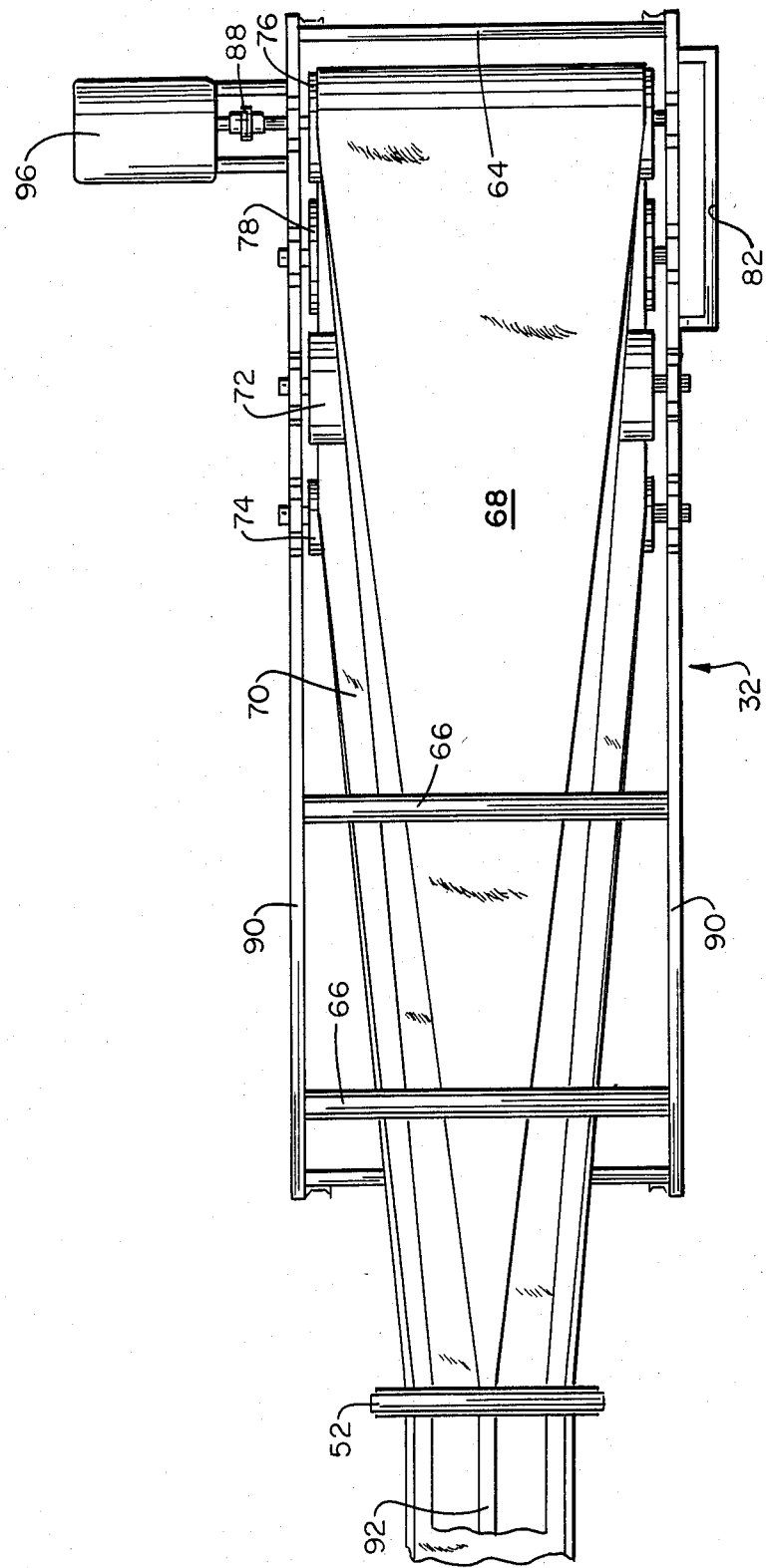
FIG. 3 is a top plan view of the head end of a laterally bendable belt conveyor system as shown in FIG. 2.

Referring to FIGS. 2 and 3, there are respectively shown a side view and a top plan view of the head end 32 of the laterally bendable conveyor system 30. Shown in FIG. 2 is a monorail track 54 from which the conveyor system 30 is suspended. The head end of the conveyor system is suspended from the monorail track 54 by means of a plurality of roller assemblies 56A, 56B and 56C. These roller assemblies are capable of free displacement along the monorail track 54 permitting the entire conveyor system 30 to be displaced along the length of the monorail track 54 as shown in FIGS. 1 and 2. The roller assemblies are each coupled to a head end upper frame 94 which are integral parts of the head end of the conveyor system from which the remaining, lower portions thereof are rigidly suspended. Similarly, a primary belt shaper roller assembly 84 is coupled to the primary belt shaper 52 by means of an upper support frame 95 for maintaining the primary belt shaper in position while supporting the flexible, endless belt 36. Adjacent support elements coupled to adjacent roller assemblies are pivotally coupled together by means of tram drawbars 86.

Rigidly coupled to the forward upper frame member 94 by means of a coupling bar 97 is a head end drive mechanism 58 for displacing the head end 32 along the monorail track 54. The head end drive mechanism 58 is conventional in design and typically would include an electric motor (or motors) which drive a set of wheels (not shown) which engage and run along the monorail track 54 for displacing the conveyor system's head end therealong.

Coupled to each end of head end 32 are front support members 60 and rear support members 62. The front and rear support members 60, 62 in combination form a frame from which the base member 64 of the head end of the conveyor system is suspended. The base member 64 supports a plurality of rollers which engage the flexible, endless belt 36 for the guiding and transport thereof.

Shown in FIGS. 2 and 3 are four rollers for engaging and guiding the flexible, endless belt 36. These rollers are rotationally mounted upon and coupled to base member 64 by means of conventional brackets which permit the rotation of the rollers as indicted by the direction arrows in FIG. 2. The flexible, endless belt 36 will hereinafter be described in terms of an upper, transport length 68 and a lower, return length 70. The transport length 68 of the belt is wrapped around the rearmost roller 76, guided between rollers 76 and 78 so as to engage the upper portion of the roller 78, and then wound around the lower portion of roller 72 and the upper portion of the forwardmost roller 74. From FIG. 3 it can be seen that a conventional drive means 96, such as an electric motor, is connected to roller 76 by means of shaft/coupler means 88. With drive means 96 rotating roller 76 in a direction indicated in FIG. 2, transport and return lengths 68, 70 of the endless belt will be displaced in the direction indicated by the arrows in FIG. 2. While FIG. 3 shows only roller 76 coupled to a drive means, additional drive means may be connected in a conventional manner to one or more of the remaining rollers in the conveyor system's head end 32. This, of course, will permit the use of longer belt lengths, accommodate increased conveyed material loads, and permit the conveyor system to be extended along a more curvilinear path. Belt drive means 96 is securely mounted upon a base structure 87 which is securely coupled to and integral with the lower portion of the conveyor system's head end 32. A belt drive housing 82 is mounted upon a support structure 82 which is also rigidly coupled to a lower portion of the conveyor system's head end 32. Belt drive housing 82 shields an end portion of rollers 76 and 78 and the means upon which they are rotationally mounted from impact with potentially damaging obstructions.

The conveyor system's head end 32 includes structural members 66 which couple lateral portions of the head end for increasing the structural integrity thereof. The solid particulate material transported via the endless belt 36 is discharged therefrom as the belt is displaced around roller 76. The belt then transits around and between rollers 72, 74 and 78 after which it is displaced in a second, opposite direction as a return length 70. After discharge from the endless belt, the transported material is deposited upon more conventional conveying means 80, which need not be capable of material transport around corners, by means of which the recovered material is removed from the mine.

Figure 4:
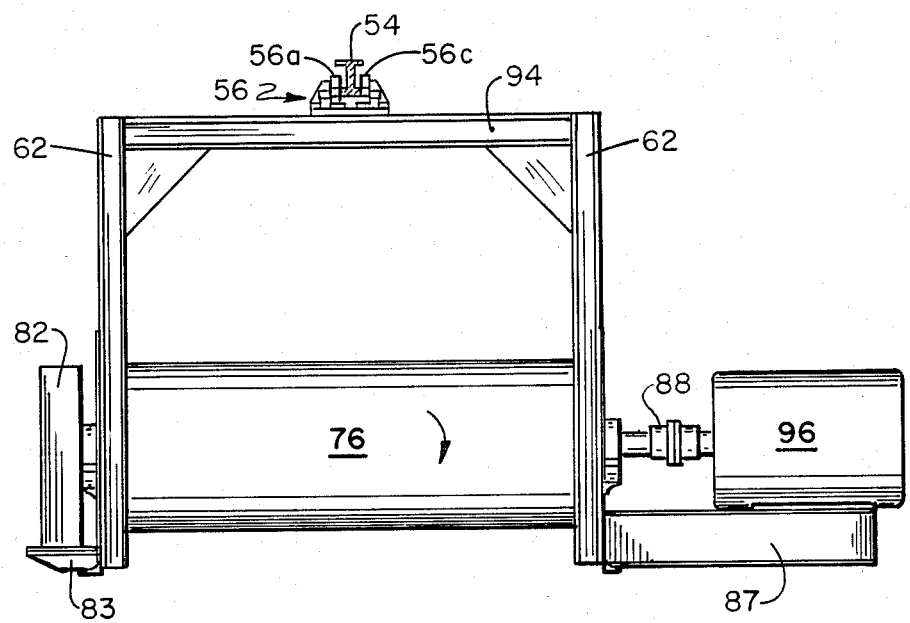
FIG. 4 is a cross-sectional view taken along line 4—4 of FIG. 2 with conventional conveying means 80 deleted.

Referring to FIG. 4, which is a sectional view taken along the site line 4—4 of FIG. 2, it can be seen that the monorail track 54 in a preferred embodiment is in the form of an "I" beam. Each upper frame member 94 of the conveyor system's head end 32 is displaceably coupled to and positioned on the monorail track 54 by means of a roller assembly 56. Each roller assembly 56 includes rollers 56A, 56C which are rotationally mounted to the roller assembly and positioned on the monorail track 54. This roller-flat surface combination permits the conveyor system's head end 32 to be further displaced along the monorail track which is securely mounted to an overhead surface of the mine.

Figure 5C:
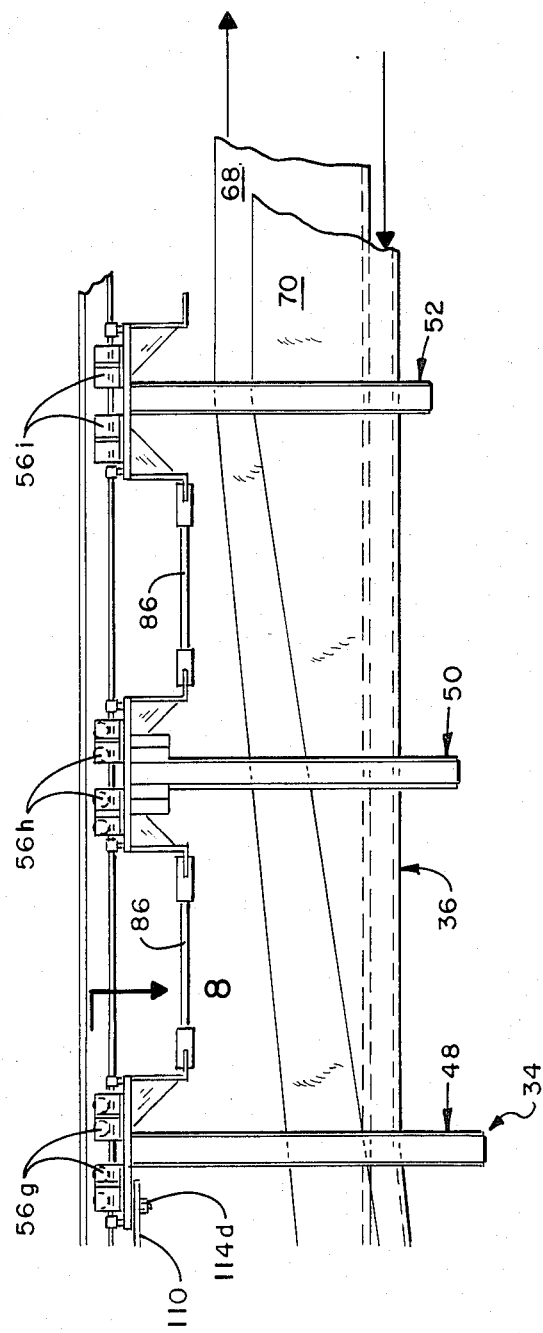

Referring to FIGS. 5a, 5b and 5c, there is shown a side view of a discharge conveyor arrangement of a continuous mining machine cooperatively coupled to the tail end 34 of the laterally bendable belt conveyor system of the present invention. The continuous mining machine 44, (FIG. 5a) which is of conventional design, includes a discharge boom conveyor 100 which transports the recovered material from the mined surface for deposit upon the moving belt of a bridge conveyor 46. One end of the bridge conveyor 46 includes a bridge conveyor coupler 104 (FIG. 5b) which is pivotally coupled to the conveyor system's tail end 34 by means of cylindrical-shaped mounting 108 which is connected to the lower surface of coupling bracket 110 of the tail end portion of the conveyor system. This pivoting flexibility minimizes the amount of tramming coordination required between the continuous mining machine and the operator of the laterally bendable belt conveyor system which is provided with tractors (not shown). These tractors permit the tail end of the conveyor system to be moved about the confines of the mine so as to always be positioned in cooperative engagement with the ever-moving continous mining machine.

The tail end 34 of the conveyor system is movably supported from the monorail track 54 by means of roller assemblies 56D and 56E. In addition, conventional drive means 102 are coupled to roller assembly 56D of the tail end portion of the conveyor system for propelling it along the monorail track as required in order to follow the continuous mining machine. As in the case of the drive means for the head end portion of the conveyor system, drive means 102 may be of conventional design generally employing an electric motor, or motors, for driving rollers resting on the monorail track 54 for displacing tail end 34 therealong.

As previously stated, the bridge conveyor 46 of the continuous mining machine 44 is pivotally coupled to the tail end 34 of the conveyor system. As such, displacement of the tail end 34 along monorail track 53 will result in a corresponding displacement of the bridge conveyor 46 along the monorail track 54. In addition, since coupling bracket 110 of the tail end portion, to which bridge conveyor horizontal pivot 108 is mounted, is also coupled by means of connecting pins 114D to the first intermediate belt shaper 48, this belt shaper will also be displaced along monorail 54 in response to actuation of tail end drive mechanism 102. From FIG. 5c it can be seen that the roller assembly 56G from which the first intermediate belt shaper 48 is suspended is coupled by means of a tram drawbar 86 to the roller assembly 56H of the second intermediate belt shaper 50. In addition, the roller assembly 56H of the second intermediate belt shaper 50 is coupled by means of a second tram drawbar 86 to the roller assembly 56I of a primary belt shaper 52. By interconnecting adjacent primary belt shapers in this manner, the displacement of the tail end portion 34 of the conveyor system will result in a similar displacement in the entire length of the conveyor system 30. By simultaneously actuating the tail end drive mechanism 102 and the head end drive mechanism 58, the entire laterally bendable belt conveyor system 30 may be moved as desired along the monorail track 54. Thus, the entire conveyor system may be displaced so as to accommodate the continuous movement of the continuous mining machine with which it operates.

The tail end 34 of the conveyor system includes an upper panel 115 which is coupled by means of connecting pins 114B, 114C to coupling bracket 110. Upper panel 115 is also coupled by means of connecting pins 114A to roller assembly 56D. The structural frame 112 of tail end 34 includes vertical support members 116 coupled to and suspended from upper panel 115. At the lower end portions of the vertical support members 116 is mounted a base element 118 of the tail end portion of the conveyor system. Mounted on base element 118 is a swivel assembly 134 upon which is positioned a mounting platform 122. Positioned upon mounting platform 122 by means of a pair of mounting brackets 120 is the tail end belt driver pulley 124 around which the endless belt 36 is positioned. Also positioned on the underside of mounting platform 122 is a take-up torque motor 126, a gear reducer 128, and a rack and pinion take-up assembly 130. The aforementioned combination of components provides for the take-up of the endless belt 36 by means of the proper positioning of tail end belt drive pulley 124 in order to provide a predetermined amount of pretension on the endless belt. This pretension induced into the fabric of the endless belt by this conventional belt conveyor take-up system comprised of take-up torque motor 126, gear reducer 128, and rack and pinion take-up mechanism 130 supports the load of the particulate material conveyed when the laterally bendable belt conveyor system assumes a curvilinear shape in traversing a corner.

Also mounted on the underside surface of mounting platform 122 is a belt tracking hydraulic cylinder 132. This hydraulic cylinder provides for the rotational displacement of the tail end belt drive pulley 124 by means of swivel assembly 134. Thus, the pivotable tail end drive belt pulley 124 may be positioned with respect to the endless belt 36 by means of a servo drive system (not shown) including a belt edge detector 125 shown in dotted line form in FIGS. 6 and 7 whose signal is properly modulated, converted and amplified to acutate the belt hydraulic tracking cylinder 132 in such a manner as to maintain continuous belt tracking on the tail end belt pulley 124. The implementation of the belt tracking system just described may be conventional in nature, does not form a part of the present invention, and therefore will not be described in greater detail herein.

Figure 6:
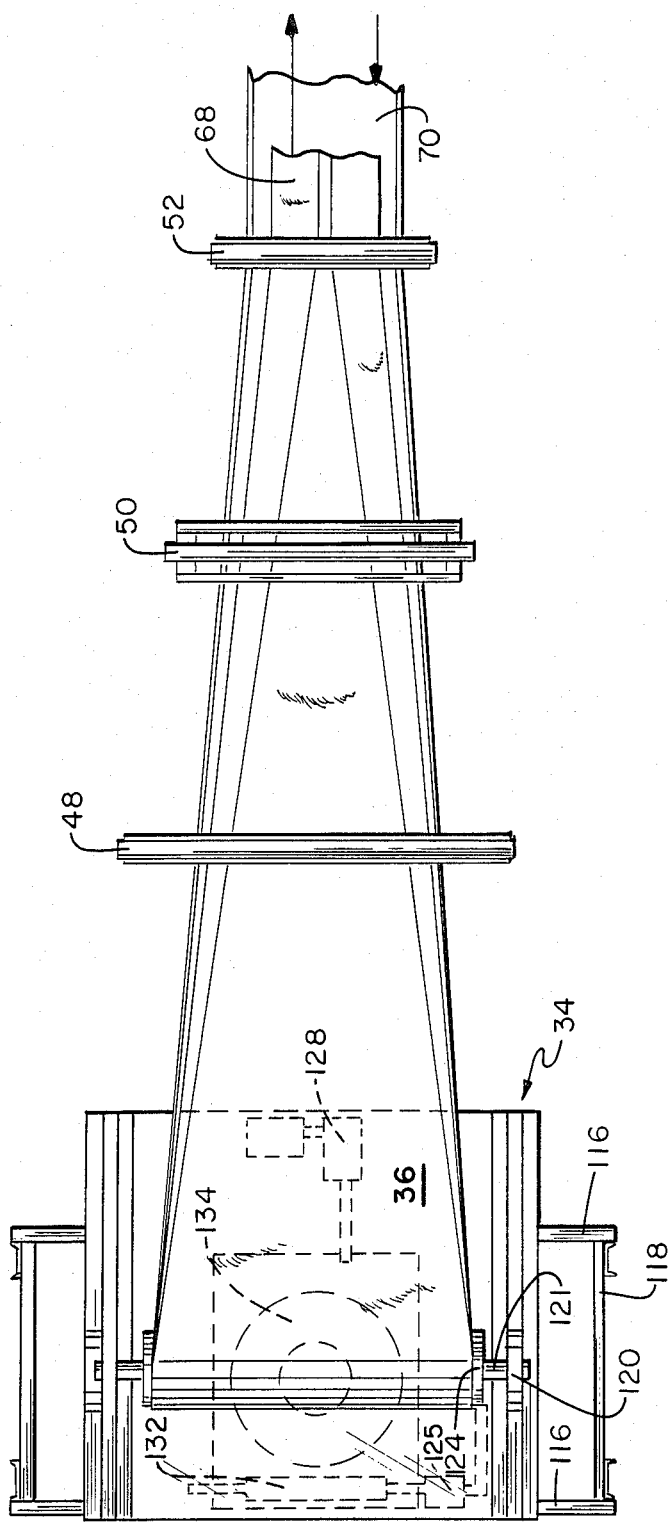
FIG. 6 is a top plan view of the tail end of the laterally bendable belt conveyor system as shown in FIG. 5c.

Referring to FIG. 6, there is shown a top plan view of the tail end portion 34 of the conveyor system without the monorail track and supporting roller assemblies coupled thereto. From this view it can be seen that the belt hydraulic tracking cylinder 132 may be utilized to control the horizontal orientation of the tail end belt drive pulley 124 and underlying swivel assembly 134 to provide accurate belt tracking in the tail end portion 34 of the conveyor system. From FIG. 6 it can also be seen that the contour of the transport length 68 of the endless belt is gradually changed from a flat configuration as the endless belt is displaced over the tail end belt drive pulley 124 to a generally tubular shape as the endless belt passes through primary belt shaper 52. The return length 70 of the endless belt undergoes a transition from a generally tubular shape to a flat configuration when transported from primary belt shaper 52 to the tail end belt drive pulley 124. A similar transition in the shape of the transport and return lengths of the endless belt occurs in the vicinity of the head end portion 32 of the conveyor system as shown in FIG. 3. Between respective primary belt shapers 52 in the vicinity of the head and tail end portions 32, 34 of the conveyor system the transport and return lengths 68, 70 of the endless belt are maintained generally in the aforementioned tubular configurations. A more complete description of the various configurations assumed by the endless belt and the means utilized for thus configuring the belt is provided below.

Figure 7:
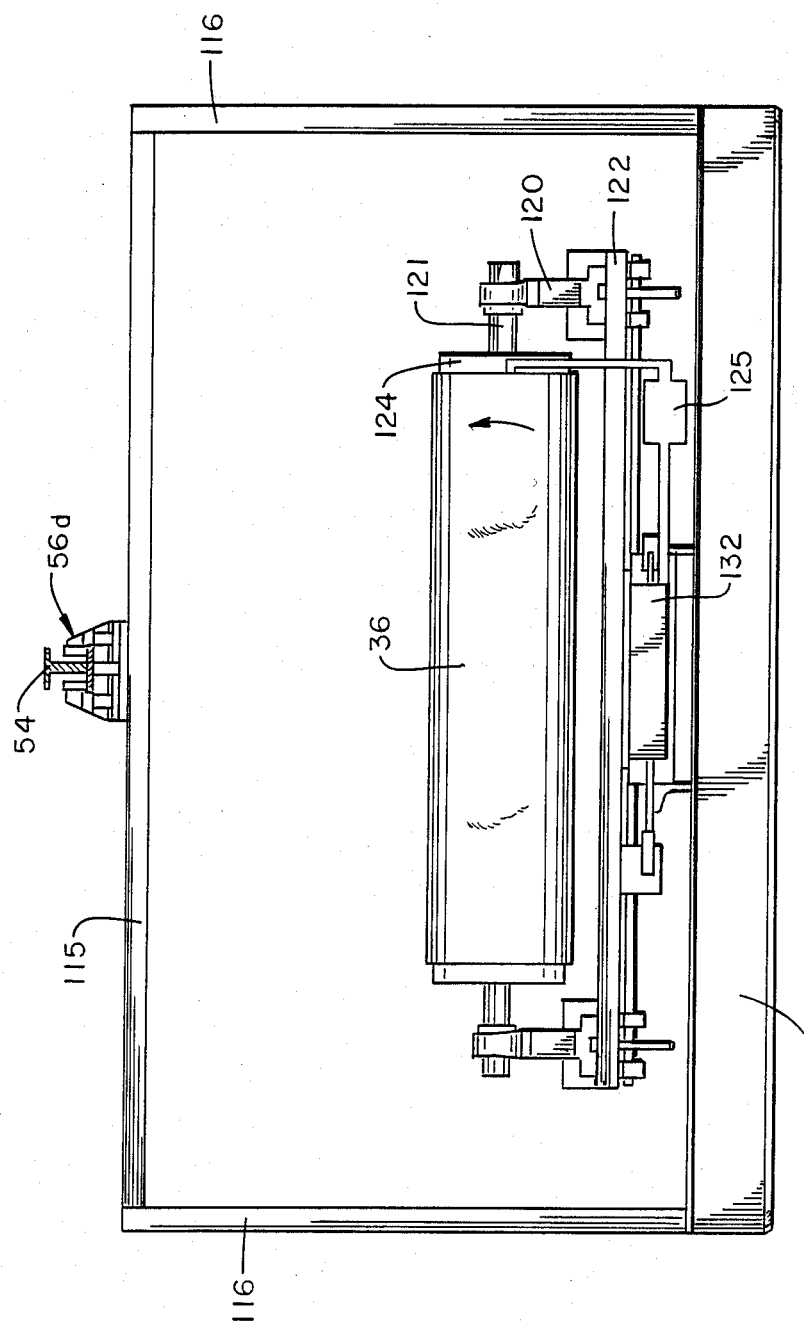
FIG. 7 is a cross sectional view of the tail end of the laterally bendable belt conveyor system taken along the line 7—7 of FIG. 5b with the miner's bridge conveyor 46 removed.
Figure 8:
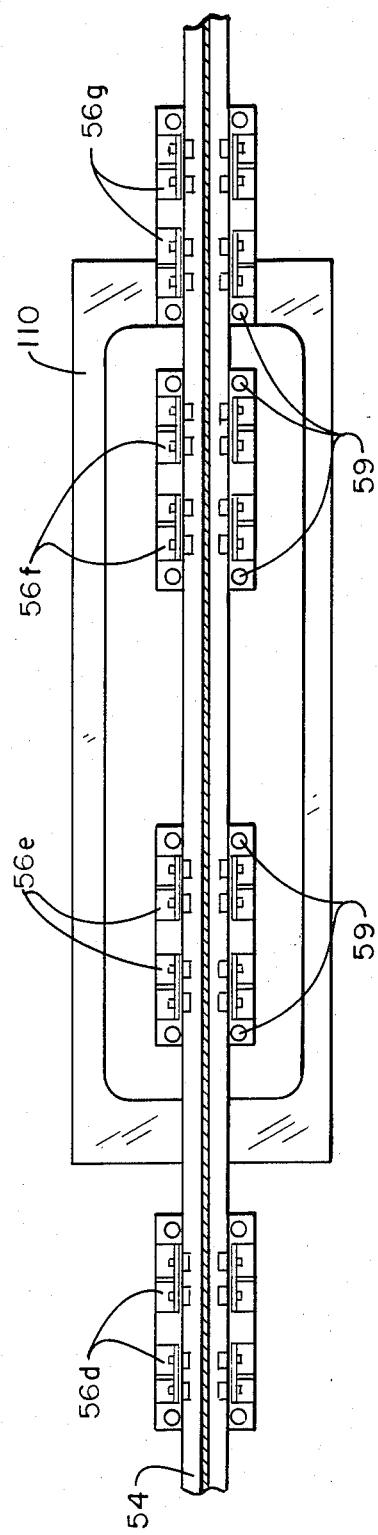
FIG. 8 is a sectional view of the tail end of the laterally bendable belt conveyor system taken along line 8—8 of FIGS. 5b and 5c.

FIG. 7 is a cross sectional view of the tail end of the laterally bendable belt conveyor system of the present invention taken along the line 7—7 of FIG. 5. This view shows in greater detail that the tail end portion 34 of the conveyor system is suspended from the monorail track 54 in a manner similar to that in which the head end portion of the system is suspended therefrom. The bridge conveyor 46 has been omitted from FIG. 7. FIG. 8 is a sectional view of the tail end portion of the laterally bendable belt conveyor system taken along the line 8—8 of FIG. 5. From FIG. 8, it can be seen that coupling bracket 110 is mounted to roller assemblies 56E, 56F and 56G in a conventional manner such as by a plurality of connecting pins or bolts 59.

Figure 9:
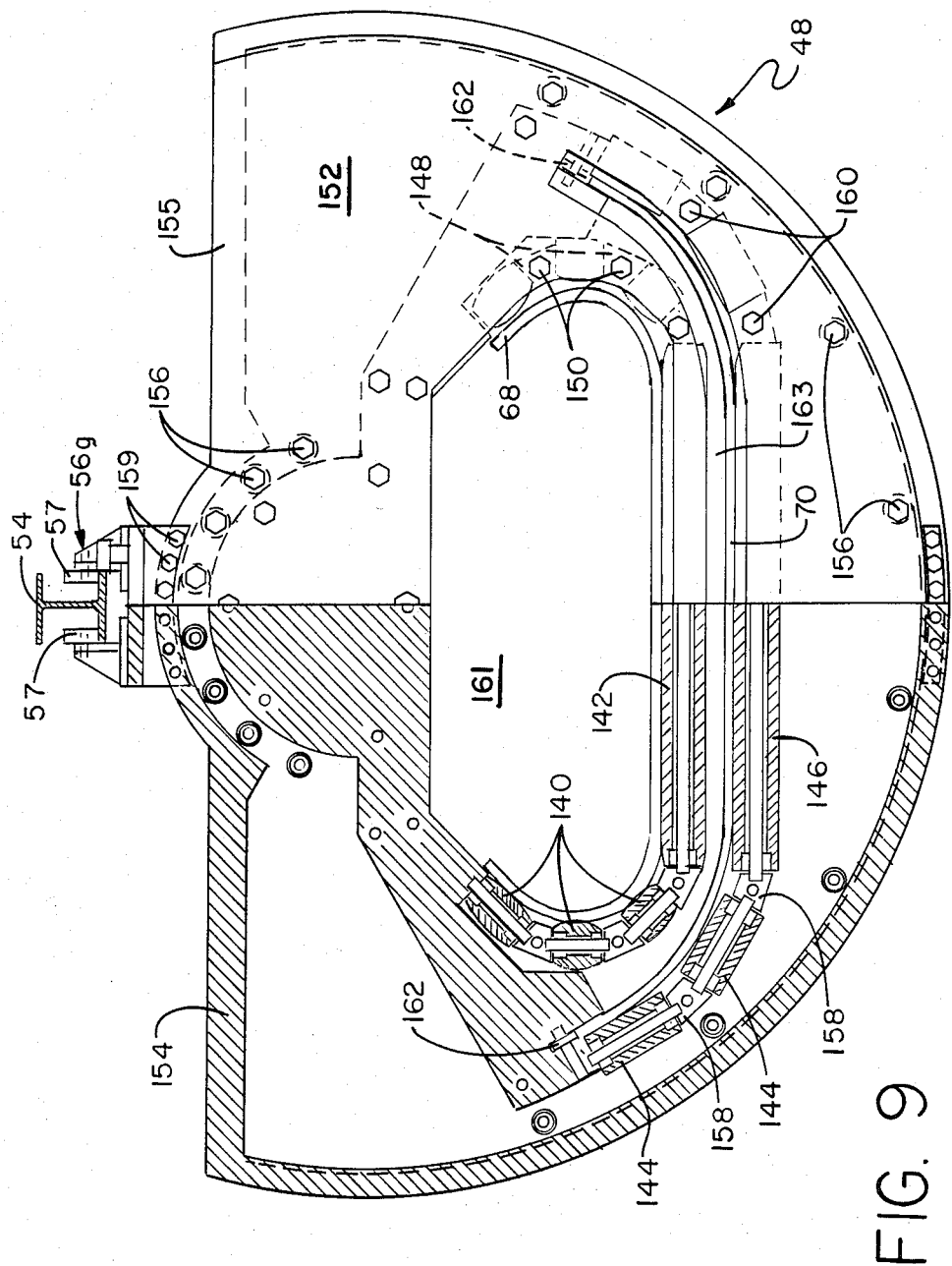
FIG. 9 is a partially cut away cross sectional view of a first intermediate conveyor belt shaper as used in the laterally bendable belt conveyor system.
Figure 10:
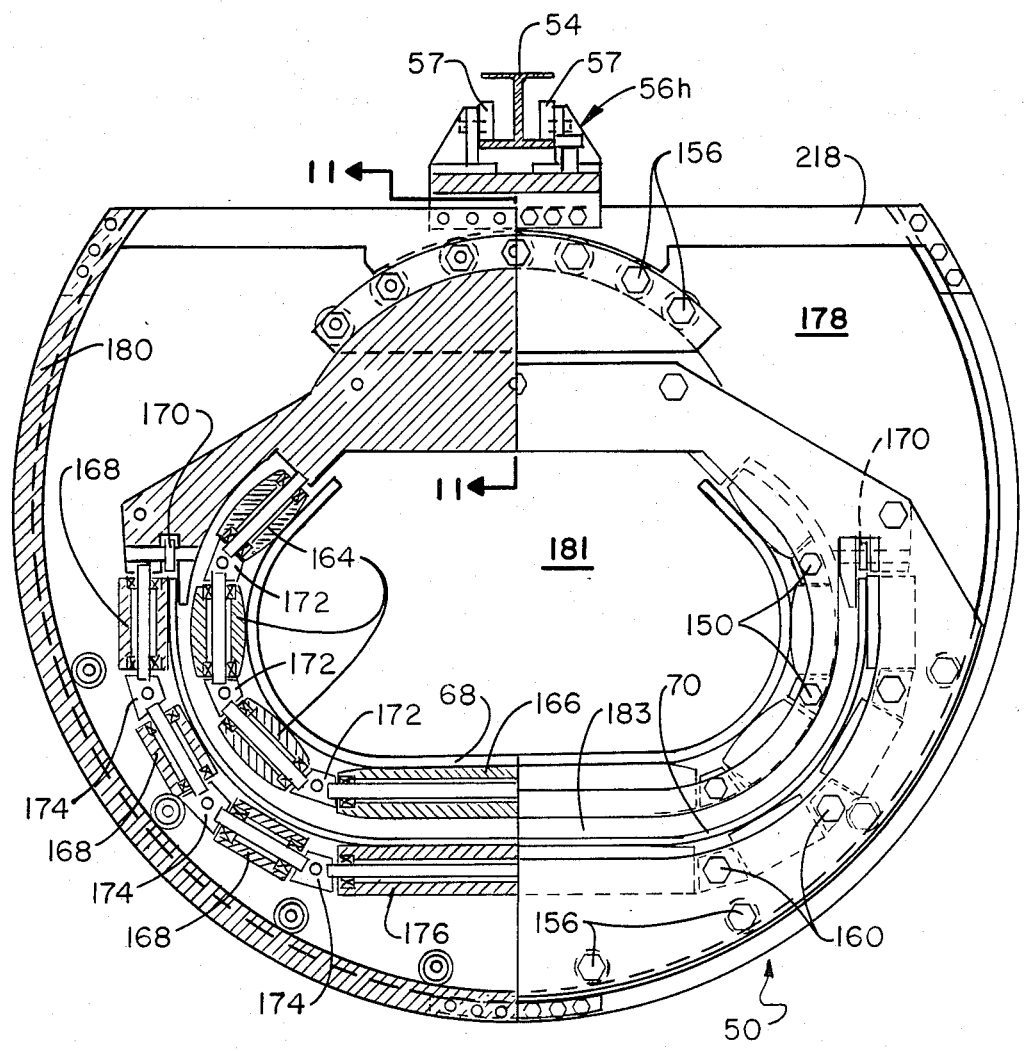
FIG. 10 is a partially cut away cross sectional view of a second intermediate conveyor belt shaper as used in the laterally bendable belt conveyor system.

Referring to FIGS. 9 and 10, there are shown partially cutaway cross sectional views of first and second intermediate conveyor belt shapers 48, 50, respectively.

First intermediate belt shaper 48 includes an upper mounting/support element 155 positioned along the upper portion thereof which is coupled by means of a plurality of connecting pins 159 to roller assembly 56G. Roller assembly 56G includes two roller assembly wheels 57 rotationally coupled thereto and positioned on monorail track 54 to provide for the linear displacement of the first intermediate belt shaper 48 along the monorail track. First intermediate belt shaper 48 also includes a front plate 152 coupled by means of a plurality of coupling pins 156 to a rear plate 154. An aperture 161 is located in front and rear plates 152, 154 through which the transport and return lengths 68, 70 of the endless belt pass. A plurality of inner belt lateral rollers 140 contact the outer surface of transport length 68 for the shaping thereof as indicated in FIG. 9. An inner belt width roller 142 supports a generally horizontal portion of the transport length 68. These various inner belt rollers are maintained in relative position by means of inner roller couplers 148 which are maintained in position between front and rear plates 152, 154 by mounting pins 150. Transport length 68 is thus formed into a generally tubular shape with an opening at the top portion thereof. The inner rollers permit the transport length 68 to be easily displaced through the first intermediate belt shaper 48.

The return length 70 of the endless belt passes through the first intermediate roller via a second aperture 163 therein. The return length 70 is shaped by means of an outer belt width roller 146 and a plurality of outer belt lateral rollers 144 each coupled and maintained in relative position by means of outer roller couplers 158. The outer roller couplers 158 are maintained in stable position within the first intermediate belt shaper 48 by means of mounting pins 160 inserted through the front and rear plates 152, 154 of the first intermediate belt shaper 48. Outer belt edge rollers 162 are provided at each edge of the return length 70 of the endless belt to provide for the stable lateral positioning of the endless belt as it transmits through the first intermediate belt shaper 48. The various rollers in contact with the return length 70 of the endless belt facilitates its aforementioned movement through the first intermediate belt shaper.

FIG. 10 is a partially cut away cross sectional view of a second intermediate belt conveyor shaper 50 as utilized in the present invention. Similar to the first intermediate belt shaper 48, the second intermediate belt shaper 50 includes an upper mounting/support element 218 rigidly coupled to the roller assembly 56H which is movably positioned on monorail track 54 by means of rollers 57 coupled thereto. A plurality of connecting pins 156 connect the front and rear plates 178, 180 of the second intermediate belt shaper 50 together, with each plate including two apertures 181, 183 therethrough. Through the first aperture 181 is positioned the transport length 68 of the endless belt while through the second aperture 183 is positioned the return length 70 of the endless belt for displacement therethrough. The transport length 68 is shaped by means of an inner belt width roller 166 and a plurality of inner belt lateral rollers 164 which are coupled and maintained in fixed position by means of inner roller couplers 172. Through each inner roller coupler 172 is positioned a mounting pin 150 which is also inserted through front and rear plates 178, 180.

The return length 70 of the endless belt is maintained within aperture 183 and shaped to facilitate its displacement therethrough by means of a plurality of outer belt lateral rollers 168 and an outer belt width roller 176. These outer rollers are coupled together and maintained in stable position within the second intermediate belt shaper 50 by means of a plurality of outer roller couplers 174. Through each outer roller coupler 174 and adjacent portions of the front and rear plates 152, 154 is inserted a mounting pin 160 for maintaining the entire outer roller assembly stably positioned within the second intermediate belt shaper.

Comparing FIGS. 9 and 10 it can be seen that the shape of the transport length 68 of the endless belt as it is displaced away from the tail end portion 34 of the conveyor system and toward the head end portion 32 thereof is changed by means of first and second intermediate belt shapers 48, 50 into a more curvilinear form with this portion of the belt assuming a more tubular shape. Similarly, it can be seen that as the return portion 70 transits the second and first intermediate belt shapers 50, 48 as it is displaced toward the tail end portion 34 of the conveyor system, its shape transitions from a generally tubular shape to a flatter, more horizontal orientation. This gradual transition of the endless belt by means of the intermediate belt shapers facilitates its displacement along the conveyor system as it transitions from a flat configuration at the roller ends of the system to a generally tubular shape at intermediate points for facilitating belt travel around corners in a curvilinear fashion.

Figure 11:
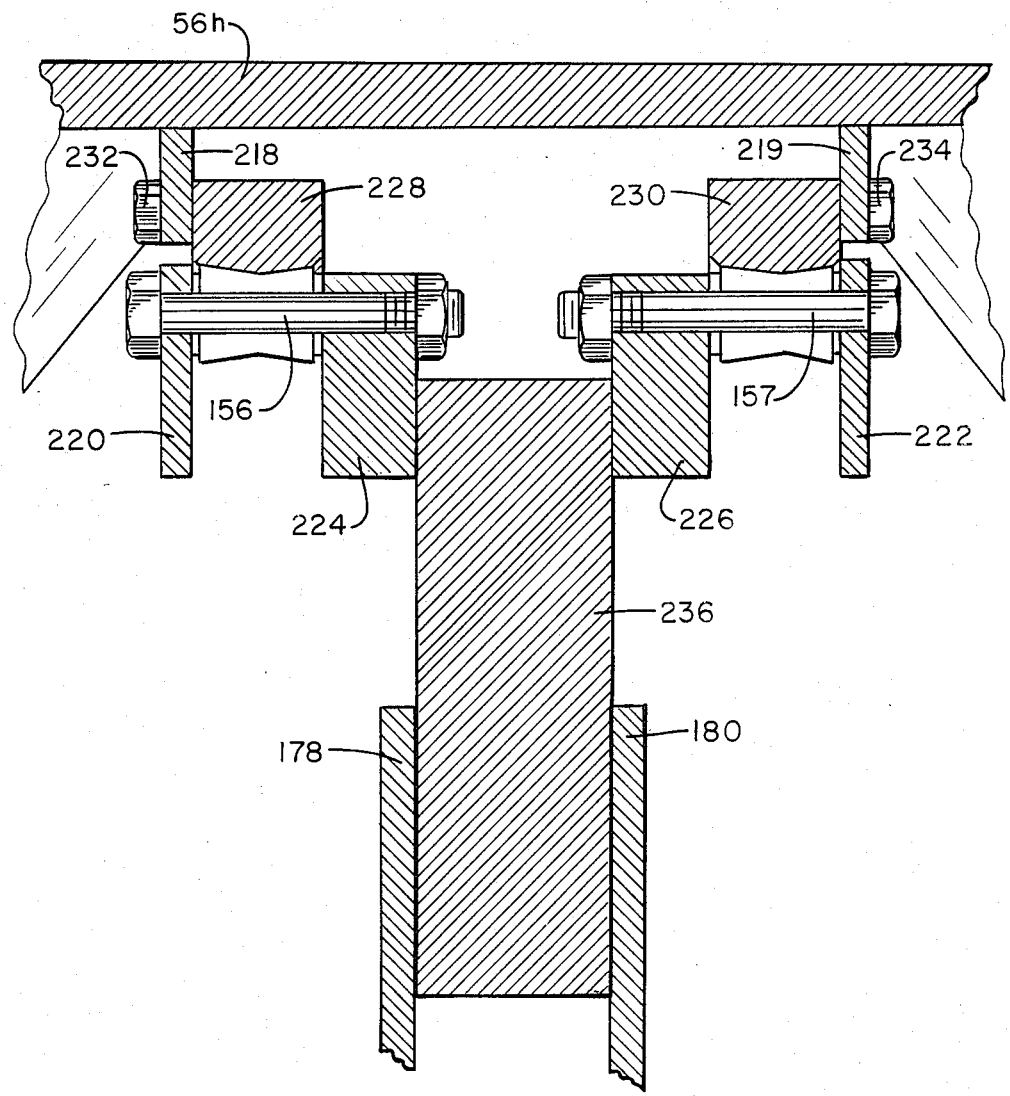
FIG. 11 is a cross sectional view of a second intermediate belt shaper taken along line 11—11 of FIG. 10.

FIG. 11 is a cross sectional view of the second intermediate belt shaper 50 taken along the line 11—11 of FIG. 10. This view shows in greater detail the mounting of the intermediate belt shaper to the roller assembly 56H. Rigidly coupled to a lower surface of the roller assembly 56H are front and rear upper mounting/support elements 218, 219. Coupled to front and rear upper mounting/support elements 218, 219 by means of front and rear mounting pins 232, 234 are inner front and rear spacer/couplers 228, 230, respectively. Inner front spacer/coupler 228 is rigidly connected to front support flange 220 and outer front spacer/coupler 224 by means of front coupling pin 156. Similarly, inner rear spacer/coupler 230 is rigidly coupled to rear support flange 222 and outer rear spacer/coupler 226 by means of coupling pin 157. Suspended between and rigidly coupled to outer front and rear spacers/couplers 224, 226 is support element 236. To the front and rear surfaces of support element 236 are rigidly affixed the front and rear plates 178, 180 of the second intermediate belt shaper 50.

Figure 12:
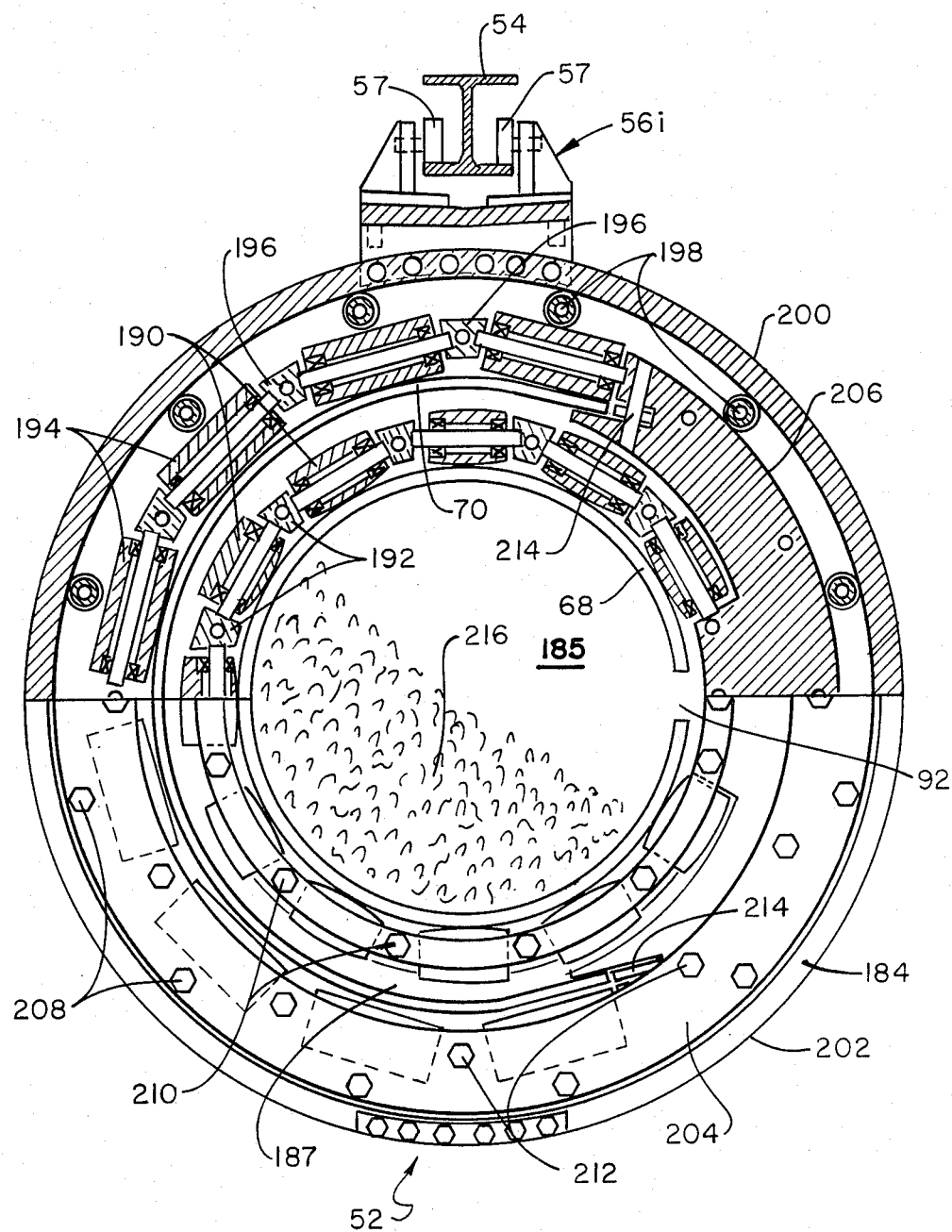
FIG. 12 is a partially cut away cross sectional view of a primary belt shaper taken along line 12—13 of FIG. 1.
Figure 13:
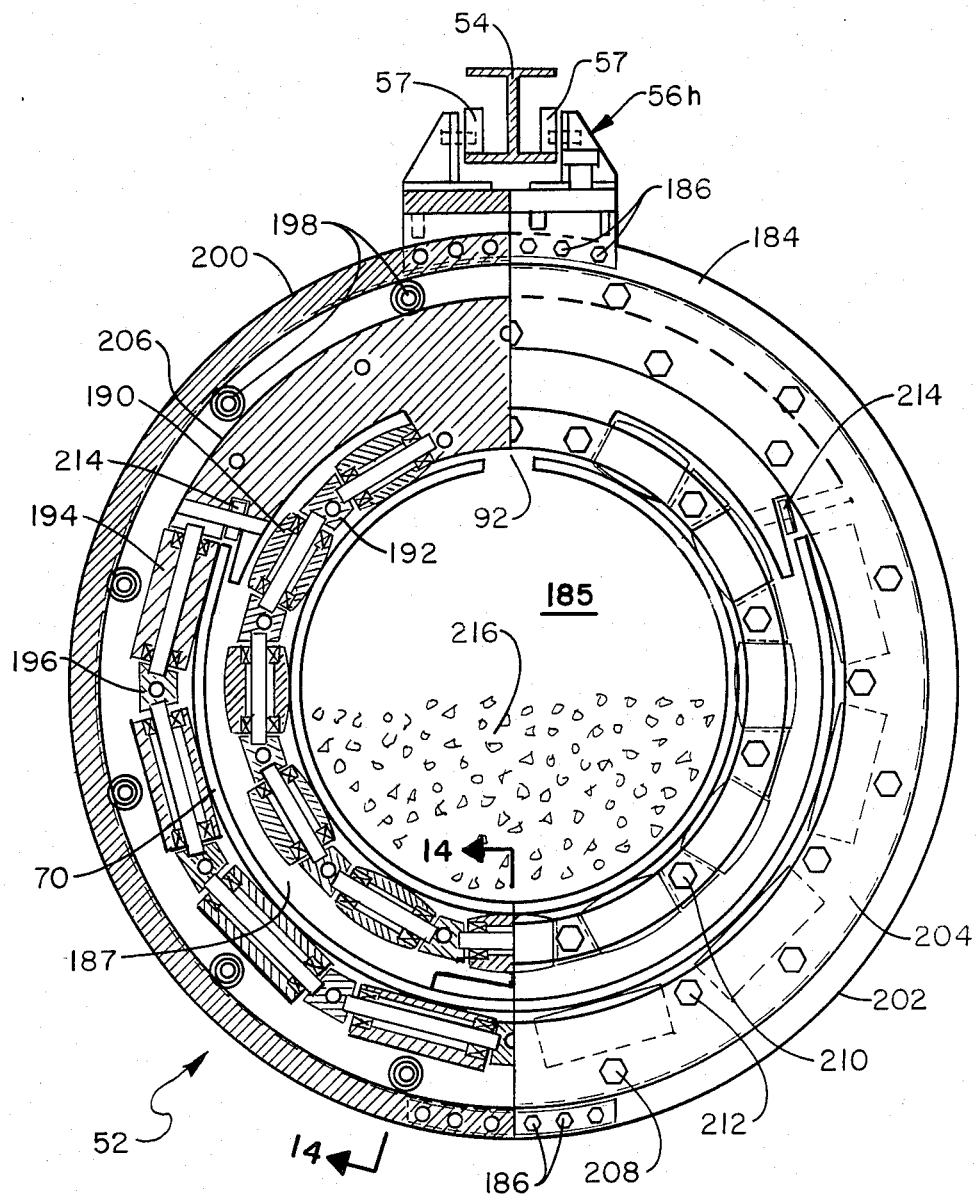
FIG. 13 is a partially cut away cross sectional view of a primary belt shaper taken along the line 13—13 of FIG. 1.

Referring to FIGS. 12 and 13 there is shown a partially cut away cross sectional view of a primary belt shaper 52 located along the length of the laterally bendable belt conveyor system 30 of the present invention. FIG. 12 is a view taken along line 12—12 of FIG. 1, while FIG. 13 is a view taken along the line 13—13 of FIG. 1. The configuration of the primary belt shapers shown in FIGS. 12 and 13, as well as the configuration of all other primary belt shapers in the conveyor system, are identical.

The primary belt shaper includes a front plate 184 and a rear plate (not shown) which are coupled together in a conventional manner by means of a plurality of connecting pins some of which are utilized to rigidly couple the primary belt shaper to the roller assembly 56I. The roller assembly includes roller wheels 57 positioned on monorail track 54 permitting each primary belt shaper to be displaced along the monorail track. Each primary belt shaper further includes a first, center aperture 185 and a second aperture 187. The transport and return lengths 68, 70 of the endless belt 36 are positioned within first, center and second apertures 185, 187, respectively. Particulate material 216 is shown positioned within the transport length 68 of the endless belt. This portion of the belt is shaped into a generally tubular configuration by means of a plurality of inner rollers 190 coupled together by means of inner roller couplers 192. Each inner roller coupler 192 has positioned therethrough a mounting bolt 210 which is also inserted through an aperture in each of the front and rear plates of the primary belt shaper 52. Mounting bolts 210 thus maintain the inner rollers 190 in a stable position within the primary belt shaper and maintain the front and rear plates thereof in position.

A second set of outer rollers 194 is positioned within each primary belt shaper so as to contact the outer surface of the return length 70 of the endless belt and also form it into a generally tubular shape. Adjacent outer rollers 194 are linked together and held stably in position by means of outer roller couplers 196. Each outer roller coupler 196 has inserted therethrough a mounting bolt 112 which also is inserted through the front and rear plates of the primary belt shaper for maintaining the outer roller assembly stably positioned within the primary belt shaper. Positioned on each end of the return length 70 of the endless belt within each primary belt shaper 52 is an outer belt edge roller 214 for maintaining the return length 70 of the endless belt within the second aperture therein permitting it to be freely displaced therethrough.

Each primary belt shaper 52 includes an outside ring spacer around the perimeter thereof. Positioned within the outside ring spacer 200 by means of a plurality of mounting bolts 208 which are inserted through the front and rear plates of the primary belt shaper are a plurality of cluster rollers 198. The surface portion of each cluster roller 198 directed toward the center of the primary belt shaper 52 is in contact with the circular perimeter surface of an inside ring spacer 206. Incorporated in the inside ring spacer 206 are the outer rollers 194, the inner rollers 190, the first and second apertures 185, 187 in the primary belt shaper through which the transport and return lengths 68, 70 of the endless belt respectively pass. With each of the cluster rollers 198 free to rotate about a mounting bolt, or pin, 208, the inside ring spacer 206 is free to rotate within the outside ring spacer 200 which is rigidly coupled to and suspended from the roller assembly 56I. Thus, as the endless belt is transported around a lateral turn, it is free to rotate around the axis of the primary belt shaper through which it passes. The endless belt rotates within each belt shaper until rotational static equilibrium is established between the weight of the material transported and the cluster rotational components of the belt's operating tension. The angular rotation of the cluster thus varies directly with belt operating tension and the cluster's position in the turn and inversely with the coal load, the polar moment of inertia of the twisting belt and the sheer modulus of the belt material.

From FIG. 12, it can be seen that the endless belt is rotated within a primary belt shaper when transiting a lateral turn so as to position the reinforced center portion of the belt on the inside of the curve, or along the shortest path along the curve. This avoids excessive bulging in the endless belt which would substantially increase the driving force required to displace the endless belt. From FIG. 12, it can be seen that the particulate material 216 within the belt's transport length 68 assumes an inclined orientation in a lateral turn of the belt. However, since the belt's transport length 68 is formed in an almost closed tubular shape, having only a small slit 92 along the length thereof when folded upon itself, particulate material is confined within the transport length of the belt and material escape therefrom is essentially precluded. It should be noted that not only does the transport length 68 of the endless belt rotate when transiting a lateral curve, but the entire inside ring 204 including the inner and outer rollers 190, 194 and first and second apertures 185, 187 also rotate by virtue of the cluster rollers 198 positioned between the inside ring 204 and the outside ring 202.

From FIG. 13 it can be seen that when the endless belt is displaced along a straight line, the slit 92 running the length thereof is oriented at the top portion of the tubular shaped transport length 68. The particulate material 216 transported therein is well confined within the transport length 68. Similarly, the return length 70 is oriented in a generally vertical direction. The free rotational displacement of the transport and return lengths 68, 70 of the endless belt 36 is again provided for by the cluster rollers 198 positioned between the outside and inside rings 202, 204 which permits rotational displacement therebetween.

Figure 14:
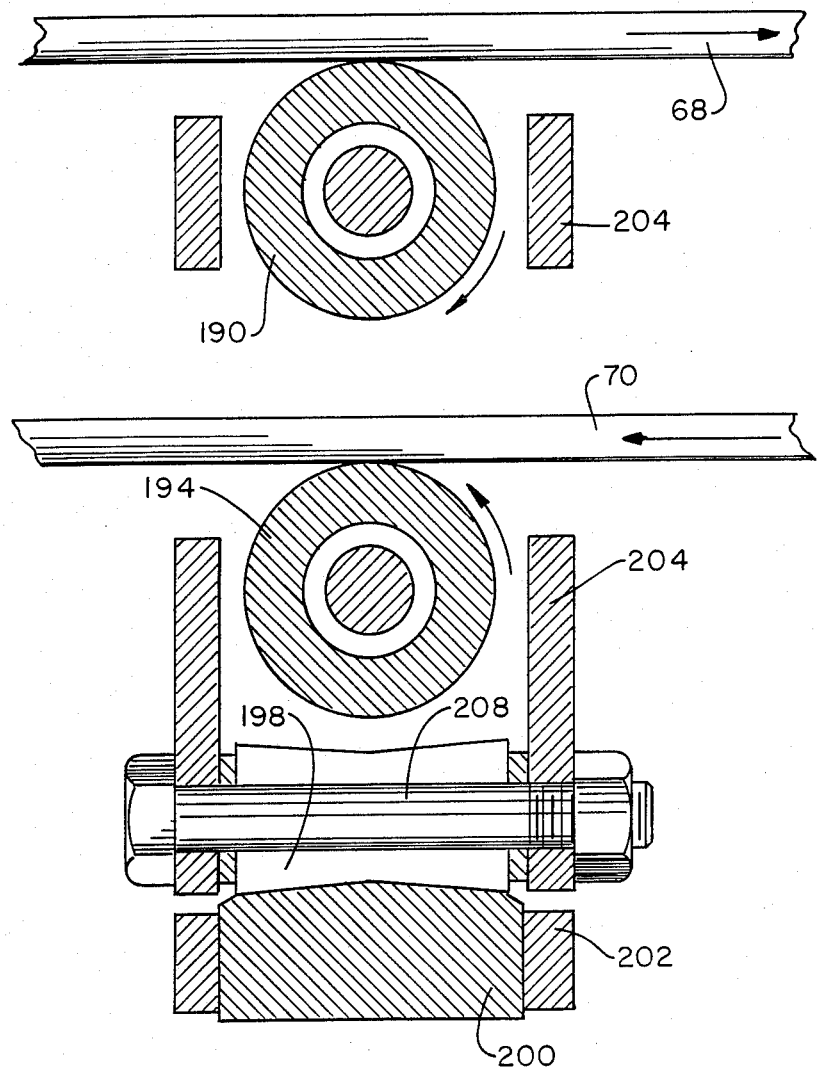
FIG. 14 is a cross sectional elevation view of a primary belt shaper taken along the line 14—14 of FIG. 13.

FIG. 14 is a cross sectional elevation view of a primary belt shaper taken along the line 14—14 of FIG. 13. From this view it can be seen that the endless belt's transport length 68 is supported by the inner rollers 190 while the return length 70 is supported by the outer rollers 194. The inside ring 204 is not continuous so as to provide for the first and second apertures 185, 187 therein. Cluster roller mounting pins 208 are positioned through the front and rear plates of the cluster roller and support the cluster rollers 198. The outside ring spacer 200 is positioned within the front and rear plates of the outside ring 202 and in rotational contact with each of the cluster rollers 198 permitting the inner ring 206 to freely rotate about the axis of a primary belt shaper 52.

There has thus been shown an endless, laterally flexible and bendable belt conveyor system particularly adapted for coal mining applications in facilitating the transport of the extracted coal up- or downslope and around corners in a continuous manner. The conveying means includes a flat rubber belt reinforced along the middle portion thereof along which the major portion of the belt tension is directed so as to cause rotation of the tubular shaped belt when trammed around lateral turns thus preventing excessive belt bulging distortion between adjacent belt supports which include a plurality of cluster rollers permitting the transport and return lengths of the endless belt to freely rotate therein.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

The embodiments of the invention in which an exclusive property or privilege is claimed are defined as follows:

1. A movable conveyor system for continuously transporting solid particulate material along a curved path, said system comprising:
   an endless, laterally flexible conveyor belt having substantially more resistance against longitudinal tension in the center portion thereof than in the marginal portions thereof, said belt including a transport length and a return length;
   a plurality of adjustable support means for supporting and shaping the transport and return lengths of said belt, each of said support means including inner transport means for engaging the conveyor belt surface along its transport length to permit the longitudinal displacement thereof in a first, inner supported troughing configuration, outer transport means for engaging the belt surface along its return length to permit the longitudinal displacement thereof in a second direction opposite to said first direction and in a second, outer supported troughing configuration, and rotational support means aligned and cooperating with said inner and outer transport means to permit at least 90° rotation of the transport and return length of said conveyor belt about the longitudinal axis thereof along a curved path of said conveyor system, said adjustable support means supports the inner transport means and the outer transport means along with their engaged belt lengths in a substantially concentric belt troughing configuration for rotation about the longitudinal axis of the transport length of the belt; and
   drive and idler means for longitudinally displacing said conveyor belt and applying sufficient tension differentially across the width of said belt for supporting the particulate material thereon between adjacent support means and for rotationally displacing the center portion of said conveyor belt towards the inner circumference of lateral bends along the said curved path.

2. The system of claim 1 wherein said system includes a head end and a tail end, wherein said head end is supported by means of an overhead track and said tail end includes tractor means for the displacement thereof as desired.

3. The system of claim 2 wherein said tail end is pivotally coupled to the discharge boom conveyor of a continuously advancing mining machine in providing for the continuous transport of said solid particulate material.

4. The system of claim 2 wherein said drive and idler means includes a tandem roller arrangement frictionally engaging said conveyor belt at the head end of said movable conveyor system and a single roller frictionally engaging said conveyor belt at the tail end of said movable conveyor system.

5. The system of claim 4 wherein said single tail roller is coupled to servo drive means including conveyor belt edge detector and belt tracking control means for maintaining conveyor belt tracking on said tail roller.

6. The system of claim 1 wherein said conveyor belt is comprised of a flat, continuous rubber strip reinforced in the center portion thereof.

7. The system of claim 1 wherein said inner and intermediate transport means include first and second pluralities of arcuately arranged cluster rollers respectively engaging and providing for the linear displacement of said transport and return lengths of said conveyor belt.

8. The system of claim 7 further including an inner ring spacer concentrically positioned around and engaging said intermediate transport means and wherein said outer transport means includes an outer ring spacer concentrically positioned around said inner ring spacer with a third plurality of arcuately arranged cluster rollers positioned between said inner and outer ring spacers in providing for free rotation therebetween and the rotational displacement of the center portion of said conveyor belt toward the inner circumference of lateral bends along said curved path.

9. The system of claim 1 wherein said drive and idler means includes an intermediate series of idler rollers engaging the transport and return lengths of said conveyor belt in providing for the longitudinal displacement thereof in a supported arcuate configuration intermediate said tubular and flat belt configurations for effecting belt shape transition therebetween.

10. The system of claim 1 wherein said first, inner tubular configuration is formed by the folding back upon itself of the transport length of said conveyor belt so as to substantially enclose the transported solid particulate material therein and preclude the spillage of said material therefrom when transported along a curved path.

11. The system of claim 1 wherein the center portion of said belt is positioned on an inner portion of said curved path and the marginal portions of said belt are positioned on an outer portion of said curved path for applying increased longitudinal tension to the marginal portions of said belt.

* * * * *